(12) United States Patent
Pang

(10) Patent No.: US 10,896,179 B2
(45) Date of Patent: Jan. 19, 2021

(54) HIGH FIDELITY COMBINATION OF DATA

(71) Applicant: Wavefront, Inc., Palo Alto, CA (US)

(72) Inventor: Clement Ho Yan Pang, Sunnyvale, CA (US)

(73) Assignee: Wavefront, Inc., Palo Alto, CA (US)

( * ) Notice: Subject to any disclaimer, the term of this patent is extended or adjusted under 35 U.S.C. 154(b) by 484 days.

(21) Appl. No.: 15/088,552

(22) Filed: Apr. 1, 2016

(65) Prior Publication Data

US 2017/0286486 A1 Oct. 5, 2017

(51) Int. Cl.
*G06F 16/2455* (2019.01)
*G06F 16/2453* (2019.01)
*G06F 16/2458* (2019.01)

(52) U.S. Cl.
CPC .... *G06F 16/24544* (2019.01); *G06F 16/2477* (2019.01); *G06F 16/24568* (2019.01)

(58) Field of Classification Search
None
See application file for complete search history.

(56) References Cited

U.S. PATENT DOCUMENTS

| | | | |
|---|---|---|---|
| 8,751,486 B1 | 6/2014 | Neeman | |
| 8,892,793 B1 | 11/2014 | Wong | |
| 9,152,671 B2 | 10/2015 | Lin | |
| 9,477,784 B1 | 10/2016 | Bhave et al. | |
| 2002/0176526 A1 | 11/2002 | Mejia | |
| 2007/0006054 A1 | 1/2007 | Fiedler | |
| 2008/0267213 A1 | 10/2008 | Deshpande | |
| 2009/0228285 A1 | 9/2009 | Schnell | |
| 2011/0090399 A1* | 4/2011 | Whitaker | H04N 21/4307 348/500 |
| 2011/0196947 A1 | 8/2011 | Ladd | |
| 2014/0040276 A1 | 2/2014 | Chen et al. | |
| 2014/0172866 A1 | 6/2014 | Lin et al. | |
| 2014/0279995 A1 | 9/2014 | Wang et al. | |

(Continued)

FOREIGN PATENT DOCUMENTS

WO  WO-2015094315  6/2015

OTHER PUBLICATIONS

Interpolate,linear Interpolation Formula Math@tutorvistacom, https://math.tutorvista.com/geometry/interpolation.html, Nov. 6, 2011 (Year: 2011).*

(Continued)

*Primary Examiner* — Hau H Hoang

(57) ABSTRACT

Techniques described herein perform high fidelity combination of data, for example combining time series data in response to a query. In an embodiment, a first input data stream of a first type (e.g., continuous), a second input data stream of a second type (e.g., discrete), and an operation to a function of and to be performed on the first and second input data streams are received. The second input data stream includes second input data stream samples associated with sample times. The techniques includes determining that at least some points in the second input data stream samples do not have synchronized samples in the first input data stream, automatically generating synchronized samples for the first input data stream, and performing the operation on the second input data stream samples and the automatically generated samples for the first input data stream.

17 Claims, 7 Drawing Sheets

(56) References Cited

U.S. PATENT DOCUMENTS

| | | |
|---|---|---|
| 2014/0325251 A1 | 10/2014 | Marwah et al. |
| 2015/0006256 A1 | 1/2015 | Kressner |
| 2015/0052173 A1 | 2/2015 | Leonard et al. |
| 2015/0142821 A1 | 5/2015 | Rassen et al. |
| 2015/0178139 A1 | 6/2015 | Ladd et al. |
| 2016/0071212 A1 | 3/2016 | Beaumont |
| 2016/0217160 A1 | 7/2016 | Croft |
| 2017/0011098 A1* | 1/2017 | Tsirulnik ........... G06F 17/30315 |
| 2017/0224288 A1* | 8/2017 | Halter ................. A61B 5/7289 |

OTHER PUBLICATIONS

Abadi et al. Aurora: A New Model and Architecture for Data Stream Management. The VLDB Journal (2003) / Digital Object Identifier (DOI) 10.1007/s00778-003-0095-z.

* cited by examiner

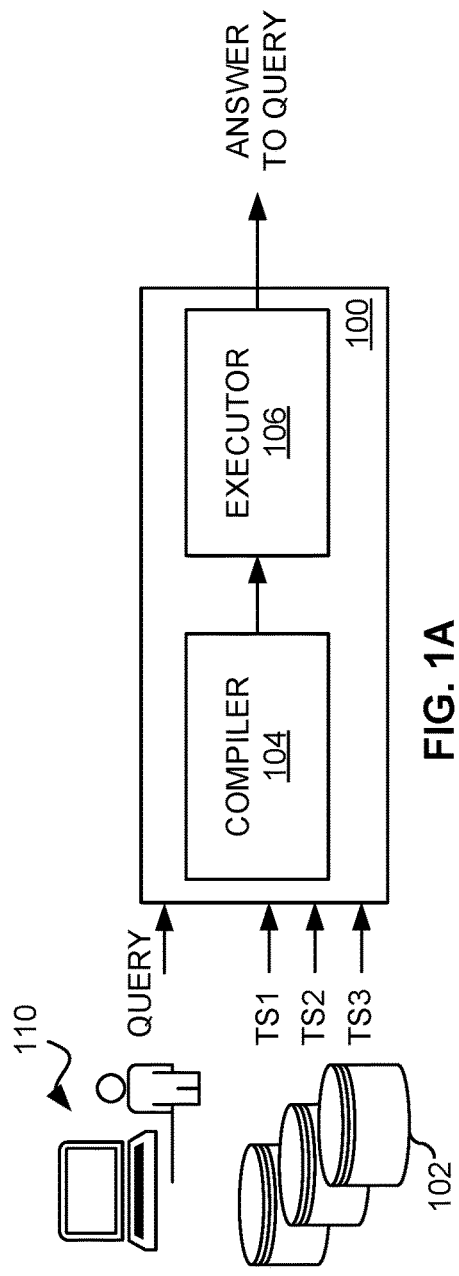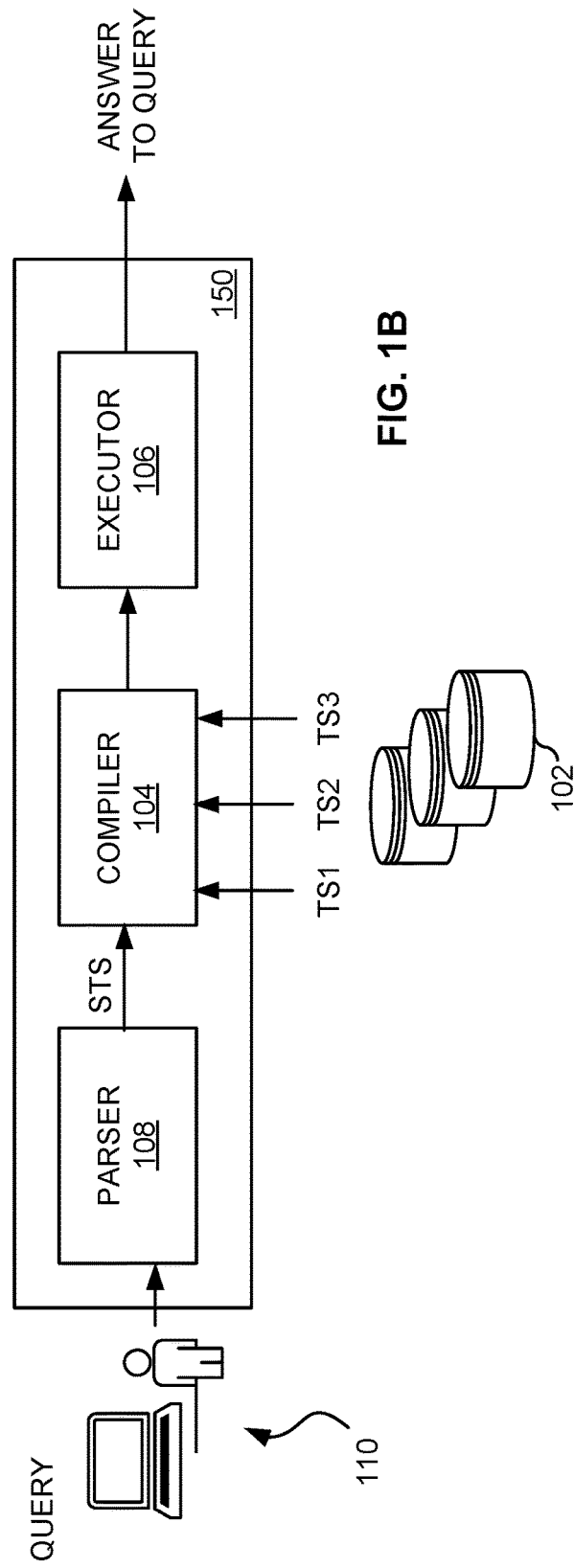

200

300

400

500

600

```
if (between weekday("PST"), 2, 3, ts(...)) > 100
    ─┬──    ──┬──────      ┬  ┬  ─┬────      ─┬─
     A        B             C  D              E
```

700

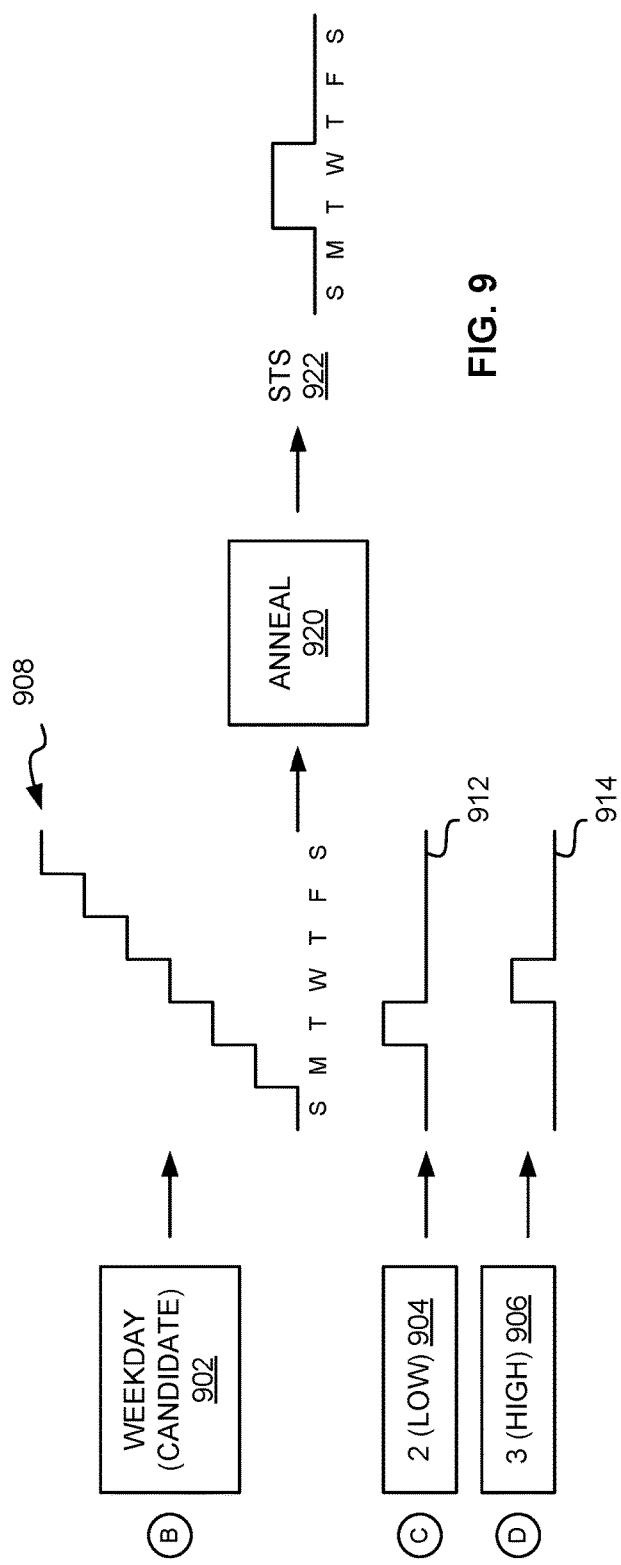
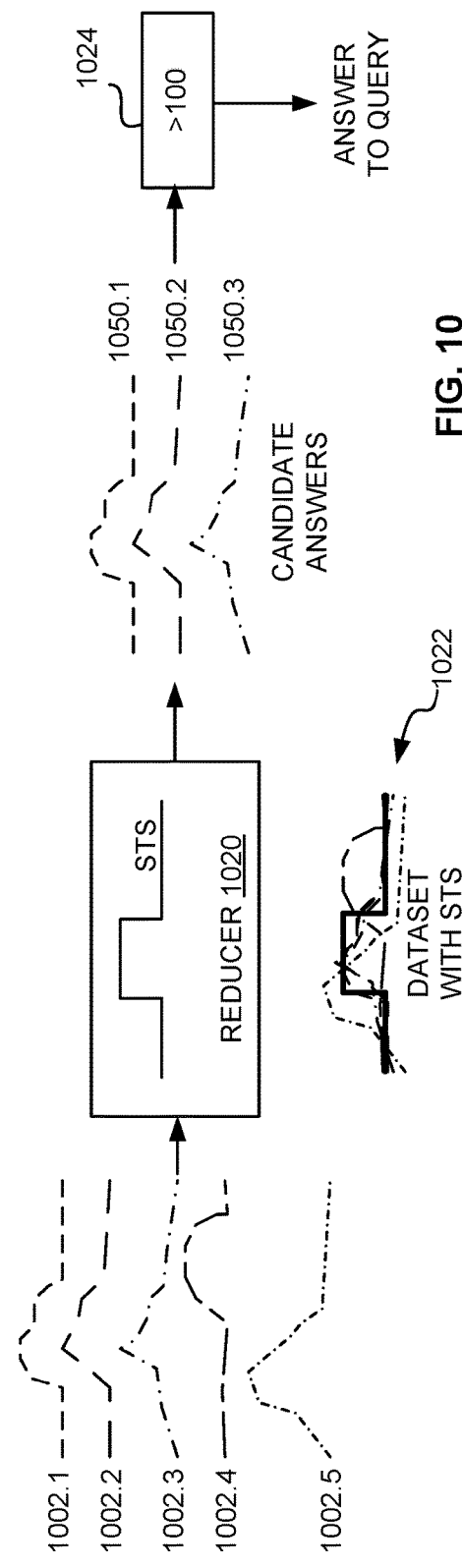
FIG. 9
FIG. 10

HIGH FIDELITY COMBINATION OF DATA

BACKGROUND

Data management has become more challenging with the increasing popularity of cloud and on-premise products offering a variety of technological services to users. Conventional techniques for monitoring these systems are unable to effectively manage applications that generate large quantities of data. In one aspect, this because conventional systems rely on log analysis, up-down monitoring of individual servers, and the like, which has limited scalability and efficiency for applications generating large quantities of data. For example, performing a query such as a relational database join operation on hundreds or thousands of time series is expensive in SQL. Additional challenges include combining data without losing fidelity, and finding particular types of data such as a time series matching a desired profile from among the numerous candidates.

BRIEF DESCRIPTION OF THE DRAWINGS

Various embodiments of the disclosure are disclosed in the following detailed description and the accompanying drawings.

FIG. 1A is a block diagram illustrating an embodiment of a system for managing data including responding to a query regarding time series data.

FIG. 1B is a block diagram illustrating an embodiment of a system for managing data including responding to a query regarding time series data.

FIG. 9 is a conceptual diagram illustrating an example embodiment generating a synthetic time series.

FIG. 10 is a conceptual diagram illustrating an example embodiment of query implementation using synthetic time series.

DETAILED DESCRIPTION

Figure 2:
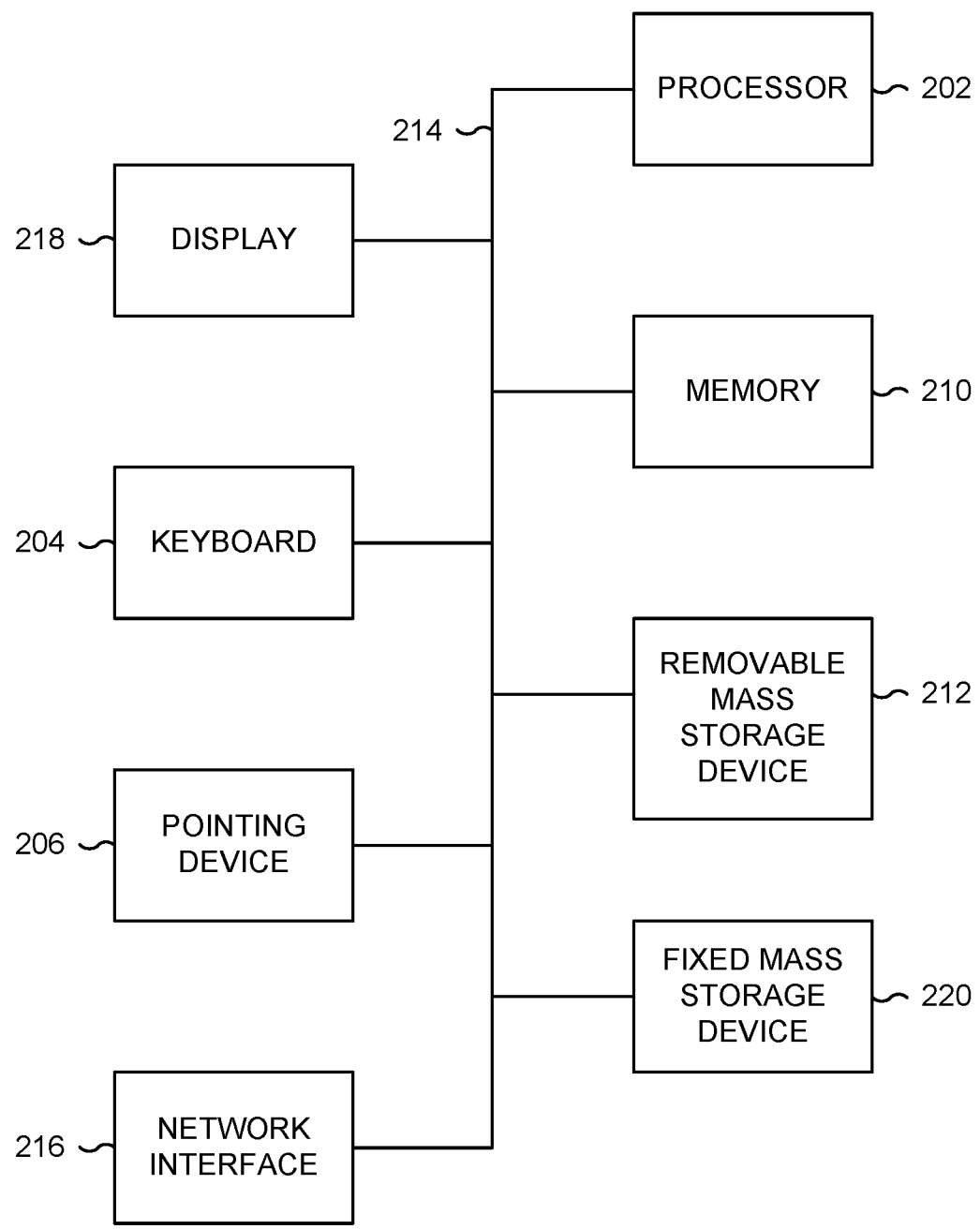
FIG. 2 is a functional diagram illustrating a programmed computer system for managing data including responding to a query regarding time series data.

The subject matter of this disclosure can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the subject matter of this disclosure may take, may be referred to as techniques. In general, the order of the steps of disclosed processes may be altered within the scope of the subject matter of this disclosure. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the subject matter of this disclosure is provided below along with accompanying figures that illustrate the principles of the subject matter of this disclosure. The subject matter of this disclosure is described in connection with such embodiments, but the disclosure is not limited to any embodiment. The scope of the disclosure is limited only by the claims and the disclosure encompasses numerous alternatives, modifications and equivalents. Numerous specific details are set forth in the following description in order to provide a thorough understanding of the disclosure. These details are provided for the purpose of example and the disclosure may be practiced according to the claims without some or all of these specific details. For the purpose of clarity, technical material that is known in the technical fields related to the disclosure has not been described in detail so that the disclosure is not unnecessarily obscured.

A numerical measurement of a system or activity can be collected and stored as a metric (also referred to as a "stream"). For example, one type of stream is a CPU load measured over time. Operations can be performed on data points in a stream. In some instances, the operations can be performed in real time as data points are received. In other instances, the operations can be performed on historical data. Metrics analysis include a variety of use cases including online services (e.g., access to applications), software development, energy, Internet of Things (IoT), financial services (e.g., payment processing), healthcare, manufacturing, retail, operations management, and the like.

It is challenging to perform operations on data streams when the data streams are not aligned, e.g., when a sample at a particular time for a first data stream does not match up with a sample at the same time for a second data stream. It is also challenging to find time series that conform to a pattern, especially when the set of time series is very large (e.g., on the order of hundreds or more). Conventional techniques grid input streams to ensure that they are aligned to allow operations to be performed on the input streams. However, gridding streams causes a loss of fidelity so that combining data in conventional systems is lossy. Techniques of the present disclosure combine data while maintaining high fidelity and quickly and efficiently identify times series that conform to a pattern.

FIG. 1A is a block diagram illustrating an embodiment of a system 100 for managing data including responding to a query regarding time series data. In one aspect, the system 100 performs high fidelity combination of data, for example combining time series data in response to a query. In another aspect, the system 100 performs operations by implementing a query using a synthetic time series. The system 100 handles both discrete data (points) and continuous data (values).

The system includes a compiler 104 and an executor 106. The system can be implemented by a query execution engine configured to parse a query, produce a query execution plan, fetch data, run the data through processing operations (also referred to as "boxes"), and determine an answer or response to the query.

In the example shown in FIG. 1A, the query is provided by a user via client 110. Time series data is provided by storage devices(s) 102. The storage device(s) 102 store and output time series data, e.g., TS1, TS2, TS3, etc. In various embodiment, the storage device(s) 102 includes a storage system such as time series database (TSDB). The data can include times series data, which may be discrete or continuous. For example, the data can include live data fed to a discrete stream, e.g. for a standing query. Conventional systems for processing time series data handles discrete points, but typically do not accommodate continuous data. Continuous sources can include analog output representing a value as a function of time. With respect to processing operations, continuous data may be time sensitive, e.g. reacting to a declared time at which a unit of stream processing is attempted, or a constant, e.g. a 5V signal. Discrete streams can be provided to the processing operations in timestamp order. In various embodiments, if data arrives out-of-order, streams can be rewound to process data in order. In an alternative embodiment, a checkpointing system can pause processing to wait for a next data point and resume processing from an earlier checkpoint to maintain a processing order. In various embodiments, processing is performed based on a wall-clock that drives a stream graph to produce expected output for a particular time. The wall-clock may be, but need not be, equivalent to real time. For example, when processing historical data or producing a live view of time series data over a time window, the wall-clock can be used to drive output from an earlier time (typically a left-most side of a timeline), moving through time and collecting values from the output, then switch to standing mode to await discrete tuples to arrive, as the wall-clock advances in real-time.

The compiler 104 receives the query and determines relevant times series data to retrieve. In the example shown in FIG. 4, relevant time series to the query are TS1, TS2, and TS3. The compiler handles a "compile phase" in which the query is analyzed. The compiler parses the query to determine operations to be performed on relevant time series data. Example operations include finding time series that match criteria defined by the query to identify anomalous behavior, joining time series data, etc., as further described herein.

The executor 106 handles an "execution phase" in which operations are performed on time series data to generate an answer to the query. In various embodiments, the executor receives commands from the compiler 104 and performs operations on the time series data. For example, one or more executors can perform the operation on the time series data in parallel. In various embodiments, the executor responds to a query about the time series data and outputs an answer to the query. Although shown as separate components in FIG. 1A, the compiler 104 and the executor 106 can be implemented as a single component. The techniques described herein can be performed by the compiler and/or the executor.

In operation, the system 100 receives a query. The compiler determines what to retrieve from time series database(s) 102 based on the query. For example, the compiler determines how many scans to make on the time series database(s). The compiler then hands off commands to executor 106 to perform an execution phase, e.g. beginning execution of the query. The executor then outputs an answer to the query. Although shown as a single stream, the answer to the query can include one or more streams.

FIG. 1B is a block diagram illustrating an embodiment of a system 150 for managing data including responding to a query regarding time series data. In one aspect, the system 150 performs high fidelity combination of data, for example combining time series data in response to a query. In another aspect, the system 150 performs operations by implementing a query using a synthetic time series. The system 150 handles both discrete data (points) and continuous data (values).

The system includes a parser 108, a compiler 104, and an executor 106. The functions of the system and system components can be like those described for FIG. 1A unless otherwise noted. The parser 108 receives a query. In the example shown in FIG. 1B, the query is provided by a user via client 110. The query is parsed according to techniques described herein, e.g. in relation to FIG. 6. A synthetic time series (STS) corresponding to the query is generated and passed to the compiler 104. Time series data is provided by storage devices(s) 102. The storage device(s) 102 store and output time series data, e.g., TS1, TS2, TS3, etc. The compiler and/or executor can reduce the input STS and time series data to determine those time series data that most closely match the STS, which can be returned as an answer to the query.

FIG. 2 is a functional diagram illustrating a programmed computer system 200 for implementing high fidelity combination of data in accordance with some embodiments. As will be apparent, other computer system architectures and configurations can be used to perform high fidelity combination of data. Computer system 100, which includes various subsystems as described below, includes at least one microprocessor subsystem (also referred to as a processor or a central processing unit (CPU)) 202. For example, processor 202 can be implemented by a single-chip processor or by multiple processors. In some embodiments, processor 202 is a general purpose digital processor that controls the operation of the computer system 100. Using instructions retrieved from memory 210, the processor 202 controls the reception and manipulation of input data, and the output and display of data on output devices (e.g., display 218). In some embodiments, processor 202 includes and/or is used to provide performs the processes described below with respect to FIGS. 5 and 6.

Processor 202 is coupled bi-directionally with memory 210, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 202. Also as is well known in the art, primary storage typically includes basic operating instructions, program code, data and objects used by the processor 202 to perform its functions (e.g., programmed instructions). For example, memory 210 can include any suitable computer-readable storage media, described below, depending on whether, for example, data access needs to be bi-directional or uni-directional. For example, processor 202 can also directly and very rapidly retrieve and store frequently needed data in a cache memory (not shown).

A removable mass storage device 212 provides additional data storage capacity for the computer system 100, and is coupled either bi-directionally (read/write) or uni-directionally (read only) to processor 202. For example, storage 212 can also include computer-readable media such as magnetic tape, flash memory, PC-CARDS, portable mass storage devices, holographic storage devices, and other storage devices. A fixed mass storage 220 can also, for example, provide additional data storage capacity. The most common example of mass storage 220 is a hard disk drive. Mass storage 212, 220 generally store additional programming instructions, data, and the like that typically are not in active use by the processor 202. It will be appreciated that the information retained within mass storage 212 and 220 can be incorporated, if needed, in standard fashion as part of memory 210 (e.g., RAM) as virtual memory.

In addition to providing processor 202 access to storage subsystems, bus 214 can also be used to provide access to other subsystems and devices. As shown, these can include a display monitor 218, a network interface 216, a keyboard 204, and a pointing device 206, as well as an auxiliary input/output device interface, a sound card, speakers, and other subsystems as needed. For example, the pointing device 206 can be a mouse, stylus, track ball, or tablet, and is useful for interacting with a graphical user interface.

The network interface 216 allows processor 202 to be coupled to another computer, computer network, or telecommunications network using a network connection as shown. For example, through the network interface 216, the processor 202 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 202 can be used to connect the computer system 100 to an external network and transfer data according to standard protocols. For example, various process embodiments disclosed herein can be executed on processor 202, or can be performed across a network such as the Internet, intranet networks, or local area networks, in conjunction with a remote processor that shares a portion of the processing. Additional mass storage devices (not shown) can also be connected to processor 202 through network interface 216.

An auxiliary I/O device interface (not shown) can be used in conjunction with computer system 100. The auxiliary I/O device interface can include general and customized interfaces that allow the processor 202 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 2 is but an example of a computer system suitable for use with the various embodiments disclosed herein. Other computer systems suitable for such use can include additional or fewer subsystems. In addition, bus 214 is illustrative of any interconnection scheme serving to link the subsystems. Other computer architectures having different configurations of subsystems can also be utilized.

Figure 3:
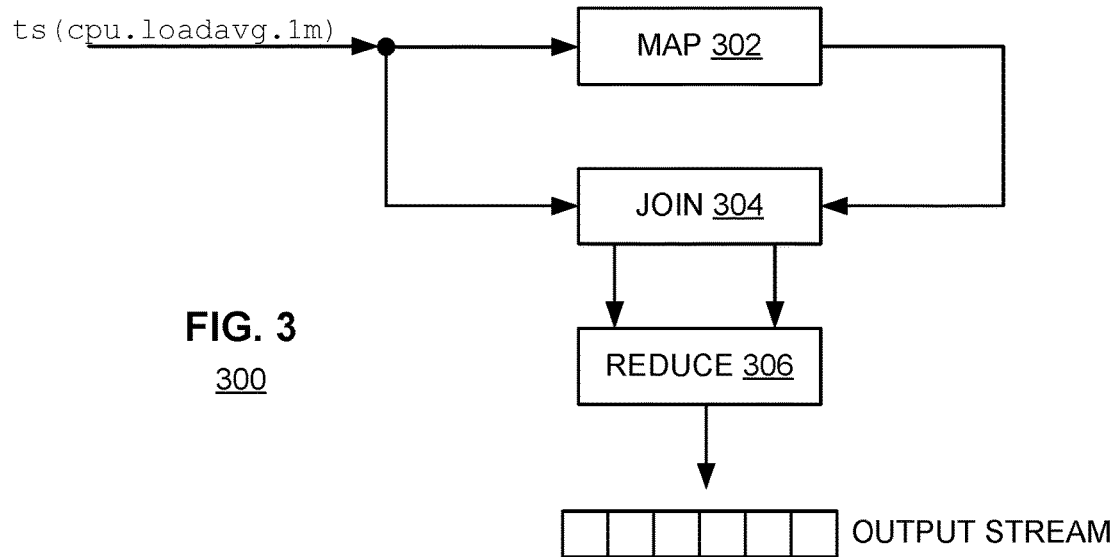
FIG. 3 is a conceptual diagram illustrating an example embodiment of a time series execution model.

FIG. 3 is a conceptual diagram illustrating an example embodiment of a time series execution model 300. The model includes processing operations (also referred to as "boxes"). As shown, example operations include map 302, join 304, and reduce 306. FIG. 3 shows the example of processing a query of "ts(cpu.loadavg.1m)+rate(ts (cpu.loadavg.1m))," where ts( ) takes a query and determines a corresponding time series. In this example, the query is for a sum of a time series corresponding to an average load of a CPU and a rate of the same time series. Rate can be implemented by a map operator such as map 302 shown in FIG. 3.

In operation, the input stream is a time series corresponding to cpu.loadavg.1m. One version of ts(cpu.loadavg.1m) is sent directly to join 304 and another is subjected to map 302. The result of map 302 is the result of the operation rate(ts. (cpu.loadavg.1m)). The join operation synthetically produces (e.g., interpolates) data points in either of the input streams, ts(cpu.loadavg.1m) and rate(ts.(cpu.loadavg.1m)), as needed to perform subsequent operations. This is further described herein with respect to FIGS. 4 and 5. In embodiments in which discrete time series data are not fully aligned, the joining includes annealing data prior to reduction. The join operation produces two processed streams, which are received by reduce operator 306. Reduce 306 sums the input streams and outputs an answer to the query. In various embodiments, the reduce operator can include operations taken on observations that occur at the same time, e.g. averaging data, summing data, etc. In the example shown, the query need not include parameters for gridding. Instead, the join operator determines and produces synthetic points such that high fidelity is maintained when combining data. That is, fidelity is preserved because gridding need not be performed.

In an embodiment (not shown), a resample operator can be applied following reduce 306 to a final continuous stream so that it is sampled at the desired resolution defined by the user and returned as discrete data.

The processing operations described herein are performed by operators. Operators can receive one or more streams, perform operations on the streams, and output one or more streams. An output stream can include characteristics, which can be tagged. For example, a flag ("isContinuous" for simplicity) can indicate whether a stream is continuous at a particular timestamp. As another example, another flag ("isContinuousUntil" for simplicity) can indicate a time up until which a stream is continuous. The isContinuousUntil flag can be used by summarization or windowing operators to prioritize discrete data. For example, when advancing a stream while summarizing for which both discrete and continuous data are available, the stream can be advanced beyond any piecewise continuous portion of the stream to obtain the discrete data. The boxes can operate on past data or in real time as the data comes in.

A constant operator outputs a constant value. In some embodiments, the constant value is output regardless of the wall-clock. In various embodiments, the output of the constant operator is continuous.

A function operator changes its output depending on a current time. For example, the current time can be based on the wall-clock. In various embodiments, the output of the function operator is continuous.

An empty operator generates no points. For example, this operation can be used when a user invokes a discrete data source that is empty.

A map operator transforms a stream. The map operator can take a function and time series as input and perform the function over one or more values of the time stream. In various embodiments, the map operator maintains the characteristics of the time series such that output for an input stream that is continuous is also continuous. In an embodiment, a series is delayed by transforming the timestamp such that the observations appear to be from another time (e.g., the past) or data from another time stamp can be brought to a present timestamp. In various embodiments, the map operator takes a timestamp (e.g., a time prior to a current time) and a value of a stream at that timestamp. This information is passed, along with a current value and time, to perform operations that use at least some of the information. For example, rate and deriv are operations based on a first timestamp, a second timestamp, and corresponding values at those times.

A filter operator processes a time series such that at least some data contained in the time series is altered or prevented from being output. The filter operator receives a stream and filters the stream based on a predicate, where the filtering removes or alters some values of the stream instead of passing the value directly downstream. For example, the filter operator can remove pre-defined values (NaN, null, etc.) from a stream, filter points based on their values or timestamps, and the like.

A last operator converts a discrete stream to a continuous stream. The conversion is made by taking each discrete value and maintaining the value for a predefined duration ("MaxDistance" for simplicity). For example, a piecewise continuous stream is reported as continuous until at least one of MaxDistance has elapsed and a timestamp corresponding to a next discrete point.

A next operator converts a discrete stream to a continuous stream. The conversion is made by taking one or more discrete values and making it available up to MaxDistance before its actual occurrence. For example, a piecewise continuous stream is reported as continuous until at least one of MaxDistance has elapsed and a timestamp corresponding to a next discrete point.

A window operator stores values over a range ("WindowSize" for simplicity) and applies a function to the data within the range. The range and the function can be provided to the window operator. In various embodiments, the output is continuous as the window can move over data at infinitely small resolutions. In various embodiments, a flag ("isDefinedWithNoValues" for simplicity) is provided to the operation and specifies whether the operation should be invoked when there are no values observed in an entire range corresponding to WindowSize. For example, if isDefinedwithNoValues is false, running the window operator over the stream produces no data.

A resample operator converts an input stream to a discrete stream that is at least paced at a predefined window size. The input stream can be discrete or continuous. The resample operator can summarize data that is present in the input stream. In various embodiments, conversion is not performed for a piecewise series that is continuous throughout the defined window. Instead, the input stream is sampled at the start of the window.

An extend operator repeats a last known value based on input parameters. The extend operator takes an input stream and a MaxDistance (e.g., as measured from the wall clock), determines a last known value of the stream, and repeats the last known value if the last known tuple has a timestamp that is within a threshold. In various embodiments, the threshold is now( )—MaxDistance, where now corresponds to a current timestamp. The extend operator facilitates operations by ensuring that sensors reporting data sporadically will have a value (a last known value) for operations such as aggregations or windowing. In various embodiments, the extend operator differs from the last operator in that the extend operator uses the wall-clock as the anchor while the last operator uses a time stamp of a last known tuple as the anchor.

An interpolate operator converts an input stream to a continuous stream by creating linearly interpolated lines between discrete data points. The input stream can be any type of stream. For example, a discrete stream is converted to a continuous stream and a piecewise continuous stream is converted to a fully continuous stream.

A default operator takes two input streams and provides an output in which one or more values from a first stream is substituted for one or more values in a second stream. In assembling an output stream, if a value for a first input stream is not available at a particular timestamp, a substitute value from a second stream is used instead. In an embodiment, attack and/or release parameters define how the substitution is performed. The attack parameter defines a length of time that the operator waits after a last value of the first stream was observed before a value from the second stream is substituted. The release parameter defines a length of time during which values from the second stream are used. For example, after the length of time has expired, the operator no longer substitutes values from the secondary stream. If the attack parameter is infinity, the second stream is not used as a substitute. If the release parameter is infinity, the second stream will be used up until the first discrete data point is observed in the first stream.

A join operator takes input times series and combines the input series. The join operator accommodates input time series including those that are not time-aligned. An input time series is automatically interpolated, for example by applying the interpolate operator internally to yield one or more values for timestamps that do not have originally sampled values. In various embodiments, each input times series is automatically interpolated. A parameter ("InnerJoin" for simplicity) defines whether the join operator invokes a given reducer function on inputs when there are time series that have not yet started or have already finished (because the interpolate operator adds points between discrete points, but not before a times series begins or after it ends). In various embodiments, a flag ("isDefinedWithNoValues" for simplicity) is provided to the operation and specifies whether the operation should be invoked when there are no values observed in an entire range corresponding to WindowSize. For example, if isDefinedwithNoValues is false, running the window operator over the stream produces no data.

The join operator can be adapted to characteristics of input streams. For example, the joining of input streams can be optimized based on the characteristics of the input streams. For example, a single-series join reduces the operation to a map reducer, operating on each point in the series. A continuous-only join is performed if all input series are continuous and optimizes the join by choosing a sampling annealer that advances each continuous stream to a given timestamp and invokes the reducers on the values. The resulting series is continuous. A single-discrete join is performed if one input series is discrete and other streams are continuous, and optimizes the join by choosing a single driving annealer that hops at the pace of the discrete series and have all the other continuous series aligned with the timestamp of the discrete series. An annealing join allows an arbitrary number of continuous and discrete streams to be joined. Continuous streams are sampled while the timestamp of the slowest progressing discrete stream is used at each step to advance the final timestamp of the resultant series. A reducer function is applied to values of the input streams. The final series is either purely discrete (e.g., if all input series are purely discrete) or piecewise continuous (e.g., a single continuous series present in the annealer would make that region of annealing continuous).

A summary of each of the operators described herein is shown in Table 1. The operators are represented with the input parameters that it takes and, if applicable, the streams with which the operation is called. For example, Join (InnerJoin, IsDefinedWithNoValues, R=f(x1, . . . , xn)) (S1, . . . , Sn) means that the join operation takes InnerJoin, IsDefinedWithNoValues, and R as parameters, and operations on input streams S1 to Sn.

TABLE 1

Operation(input parameters)(streams with which the operation is called)

Constant (K)
Function (F = f(t))
Empty ( )
Map (F = f(x,t))
Filter (P = f(x))
Last (MaxDistance)
Next (MaxDistance)
Map (F = f(xprev, tprev, x, t))
Window (F = f(x1, ... , xn, t1, ... , tn), WindowSize, IsDefinedWithNoValues)
Resample (F = f(x1, ... , xn), WindowSize)
Extend (MaxDistance)
Interpolate ( )
Default (Attack, Release) (S1, S2)
Join (InnerJoin, IsDefinedWithNoValues, R = f(x1, ... , xn)) (S1, ..., Sn)

Some of the operations described herein provide a particular output regardless of input, some operations receive a single input and provide a single output (SISO), and some operations receive multiple input and provide a single output (MISO). By way of non-limiting example, the following operations provide a particular output regardless of input: constant, function, and empty. By way of non-limiting example, the following operations are SISO: map, filter, last, next, window, resample, extend, and interpolate. By way of non-limiting example, the following operations are MISO: default and join.

In some embodiments, for example those in which an intended operation on a point stream is not streamable, an operator can memorize an entire stream while running through the stream to yield an internal array of points and timestamps. For example, a normalize operator processes a time series by first reading the entire series to determine a maximum value prior to normalizing the values of the time series.

Figure 4:
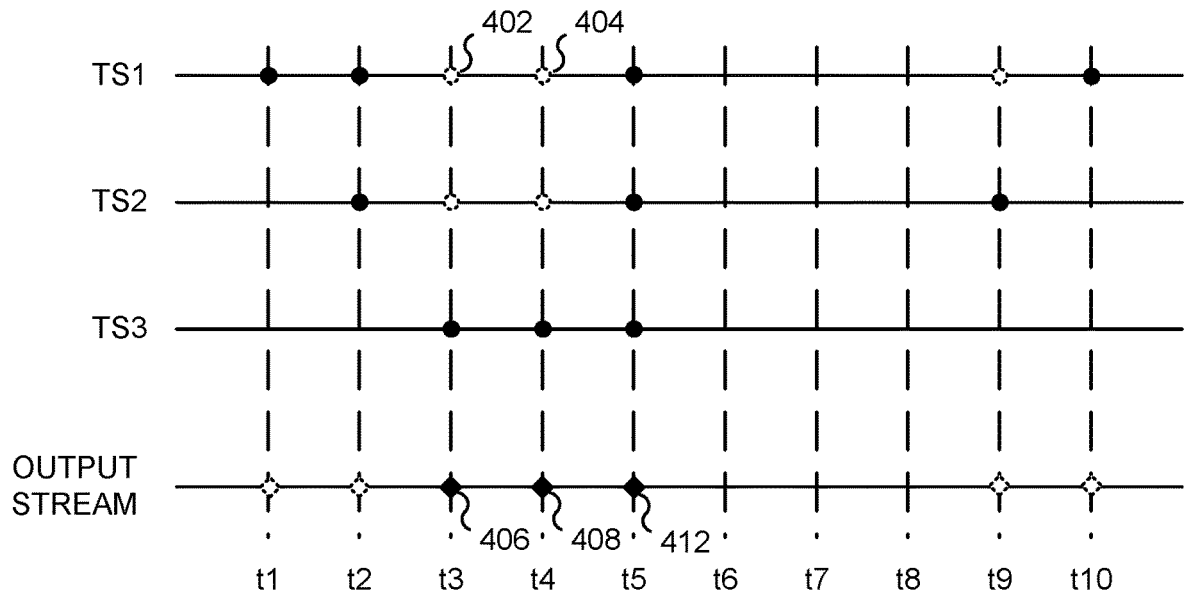
FIG. 4 is a conceptual diagram illustrating an example embodiment of a join operation.

FIG. 4 is a conceptual diagram illustrating an example embodiment of a join operation. The join operation can be performed on time series TS1, TS2, and TS3. Each time series includes sampled data points, represented by a solid circle. For example, TS1 includes sampled data points at times t1, t2, t5, and t10; TS2 includes sampled data points at times t2, t5, and t9; TS3 includes sampled data points at times t3, t4, and t5. Data points can be generated by interpolating, e.g. applying a "last" function. In the example shown, time series T1 and T2 include interpolated data points, represented by a dashed circle. Interpolated data points are those that were not collected, but are constructed based on known data points. TS1 includes interpolated data point 402 at time t3, interpolated data point 404 at time t4, and an interpolated data point at time t9. The values of interpolated data points 402 and 404 can be determined from the values of surrounding sampled data points such as the data points at times t2 and t5. In the example shown, interpolation is performed for points that have sampled data points prior and subsequent to the times missing sampled data points. Interpolation is not performed for points that are missing either a point prior to or subsequent to the missing point. TS2 includes interpolated data points at times t3 and t4. TS3 does not include interpolated data points.

Conventional techniques for generating the output stream includes summarizing, gridding, or interpolating the time series such that, at any given time, a point is available for each time series with which to perform operations. This is costly, especially if there are many time series and/or missing data points for the time series.

Techniques of the present disclosure provide for more efficient operations by interpolating points as necessary. As shown in FIG. 4, points at times t3 and t4 are interpolated, but others are not because those are the times for which output points can be generated. Whether output points can be generated depends on other times series. For example, output points are not generable at times t1, t2, t6, t7, t8, t9, and t10 in the example shown because the operation in the example expects a data point for each stream to generate output. There are no sampled data points and no data point can be interpolated for times t1, t2, t6, t7, t8, t9, and t10 for at least one of the streams. Thus, output cannot be generated even if interpolation can be performed for another one of the streams.

In FIG. 4, the result of the output stream shown represents a result of a join operation. The output stream includes defined points 406, 408, 412 at times t3-t5. At times t1, t2, t9, t10, although there is a sampled data point at a corresponding time for at least one of the time series T1-T3, there is no defined point in the output stream. This is because, for the example shown, the operation is performed for points on all time series. That is, if one of the time series does not have a point at a particular time, the operation does not generate a result for that time in the output. At times t3, t4, and t5, defined points are generated for the output because there are interpolated data points or sampled data points. At times t1, t2, t9, t10, not all streams are present because at least one stream does not have a sampled or interpolated data point. Thus, no output is generated at those times.

Figure 5:
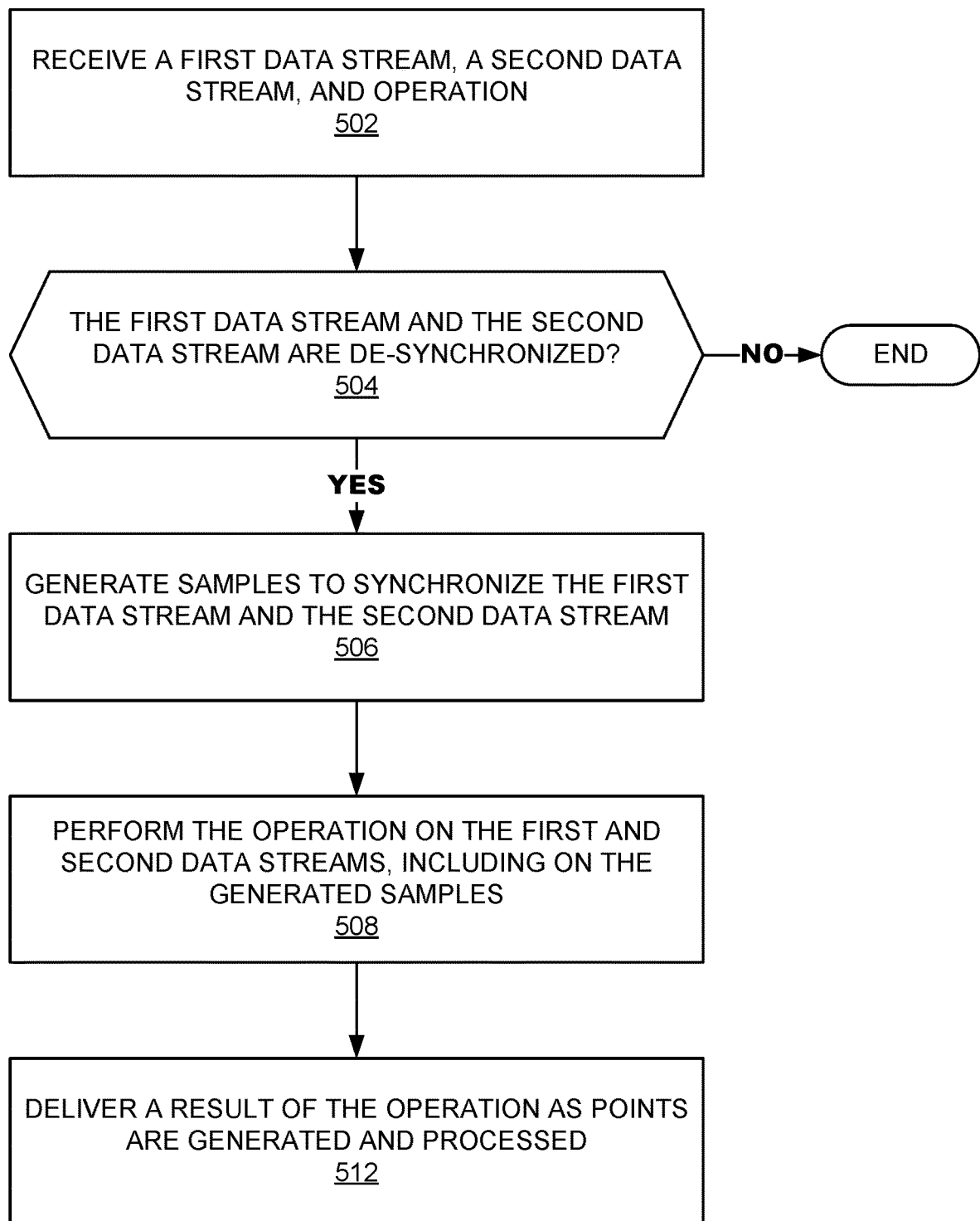
FIG. 5 is a flowchart illustrating an example embodiment of a process for high fidelity combination of data.

FIG. 5 is a flowchart illustrating an example embodiment of a process 500 (also referred to as a "method") for high fidelity combination of data. The method can be performed by a processor such as system 100 shown in FIG. 1A, the system 150 shown in FIG. 1B, or processor 202 shown in FIG. 2.

In 502, the method receives a first data stream (also referred to as "a first input data stream" or "a first stream"), a second data stream (also referred to as "a second input data stream" or "a second stream"), and an operation. Referring to the example of FIG. 4, the first input data stream is TS1 and the second input data stream is TS3. FIG. 4 also shows a third input data stream TS2. For simplicity, method 500 will be explained using only two input data streams, TS1 and TS3.

Returning to FIG. 5, in 504, the method determines whether the first stream and the second stream are de-synchronized. For example, two streams are de-synchronized if they are not aligned. Referring to the example of FIG. 4, the first input data stream TS1 and the second input data stream TS3 are desynchronized because at at least one time, a sampled data point exists for one stream but not the other. For example, at time t3, first stream TS1 does not have a sampled data point while second stream TS3 does have a sampled data point 406.

Returning to FIG. 5, if it is determined in 504 that the first and second streams are not de-synchronized (e.g., synchronized), the method can simply terminate. Otherwise, if the first and second streams are de-synchronized, the method proceeds to 506 in which the method generates samples to synchronize the first stream and the data stream. Referring to the example of FIG. 4, data point 402 is generated at time t3 and data point 404 is generated at time t4 so that first stream TS1 and second stream TS3 become aligned. A data point that is synthetically generated is called an "interpolated data point" in the example of FIG. 4.

Returning to FIG. 5, in 508, the method performs the operation on the first and second streams, including on the generated samples. Referring to the example of FIG. 4, the operation is a join operation that yields defined points 406, 408, and 412. Although there is a sampled data point for one of the streams at other times, there is no sampled point or interpolated point for the other stream. Thus, no output is generated, as represented by a "not defined" dashed diamond symbol. For example, at time t1, although first stream TS1 has a sampled data point, second stream TS3 does not. Thus, for an operation such as join that takes in a value for each stream, no output is generated for time t1. As further described herein, some operations can be performed if at least one stream has a sampled point at a particular time, in which case output would be generated.

Returning to FIG. 5, in 512, the method delivers a result of the operation. In the example shown in FIG. 5, results are delivered dynamically, e.g. as points are generated and processed, the points are delivered. The points can be delivered to a browser and rendered on a graphical user interface.

The techniques described in FIG. 5 can be used to implement a filter or a query. For example, the techniques of FIG. 5 can provide a reducer that receives a query in the form of a synthetic time series (STS). The reducer can operate on one or more times series using the STS to determine those time series that match (or most closely match) the STS to output an answer to the query. This is further described herein in relation to FIG. 6.

Figure 6:
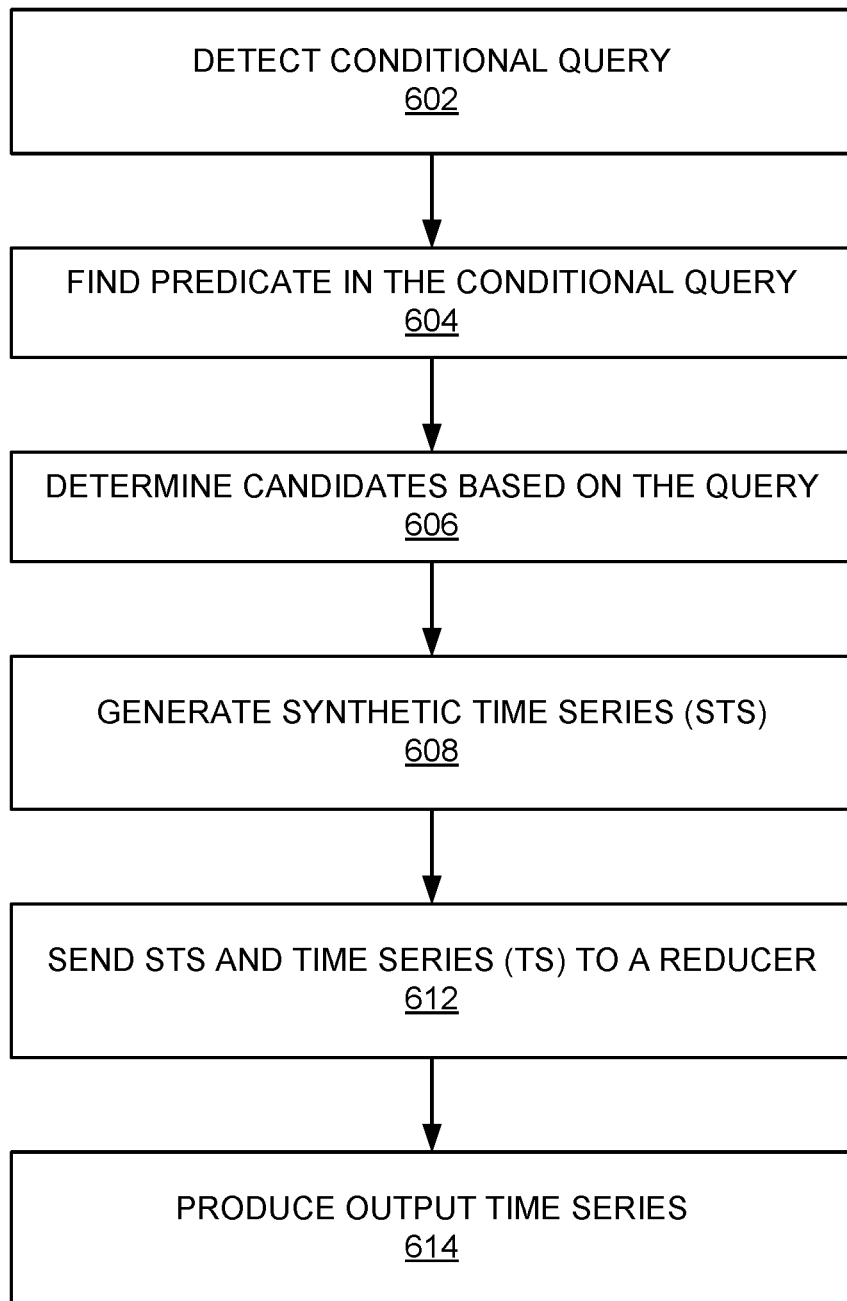
FIG. 6 is a flowchart illustrating an example embodiment of a process for query implementation using synthetic time series.

FIG. 6 is a flowchart illustrating an example embodiment of a process 600 (also referred to as a "method") for query implementation using a synthetic time series. The STS can be constructed based on the query, such that the STS acts as a filter on times series data to yield an answer to the query. For example, a query is translated to an STS. Then, one or more time series that most closely match the STS can be identified using a reduce operation. If the query is a pattern, then an STS representing the pattern is generated and those time series that most closely match the pattern are identified. The method can be performed by a processor such as system 100 shown in FIG. 1A, the system 150 shown in FIG. 1B, or processor 202 shown in FIG. 2.

In 602, the method detects a conditional query. For example, the method detects the type (e.g., conditional) of the query by parsing the query. In various embodiments, a conditional query is a query that is based on the satisfaction of one or more conditions. A conditional query can include a conditional expression, conditional logic, and the like.

In 604, the method finds a predicate in the query. The predicate can be determined during the parsing of the query. The predicate forms at least part of a basis for generating an STS and/or determining candidate time series that match the synthetic time series. The detection of a conditional query (602) and finding a predicate in the query (604) are further discussed herein with respect to FIGS. 7 and 8. In some embodiments, 602 and 604 are performed by a parser such as the parser 108 shown in FIG. 1.

In 606, the method determines candidates based on the query. The candidates can be determined during the parsing of the query. The candidates form at least part of a basis for generating an STS and/or determining candidate time series that match the synthetic time series. The determination of candidates is further discussed herein with respect to FIGS. 7 and 8.

Returning to FIG. 6, in 608, the method generates an STS. An STS can be generated for each candidate determined in 606. The STS can be used as part of a reduction process to identity time series that correspond to the STS. The generation of the STS is further discussed herein with respect to FIGS. 9 and 10.

In 612, the method sends STS and times series to a reducer. The reducer determines input time series that most closely match the STS. For example, closely matching (also referred to as "correlating") time series are those meeting a threshold or criteria related to the STS. The reducer can be implemented according to the techniques described herein, e.g. in relation to FIG. 5. The sending of the STS and times series to the reducer is further described herein with respect to FIG. 10.

In 614, the method produces an output time series. The output time series can be a response or answer to the query. In various embodiments, the output can include one or more streams, for example the top three matching data streams. The number of output streams can be defined by the query, a threshold, or other pre-defined criteria.

In an alternative embodiment, an STS query alone can be used without other types of times series such as observed time series. For example, an answer to a query for a total number of weekdays in a span of time can be generated using a STS without other types of time series.

Figures 7, 8:
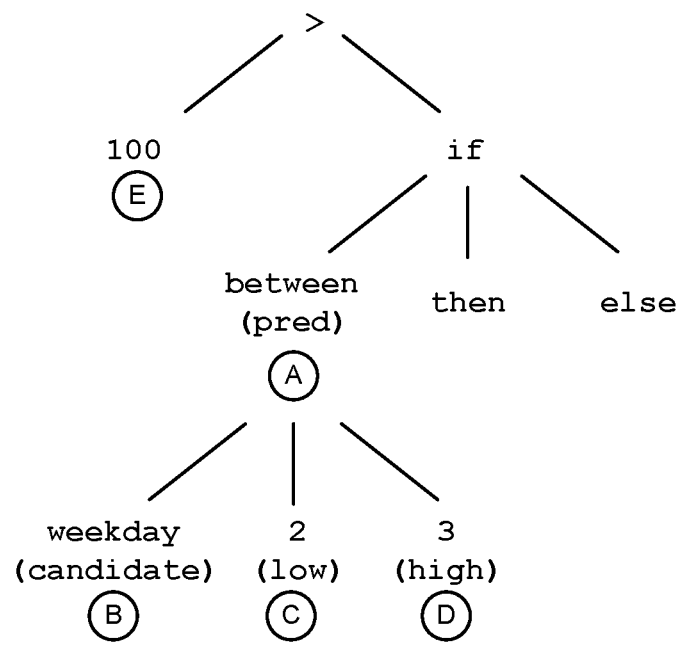
FIG. 7 is a conceptual diagram illustrating an example embodiment of a query.
FIG. 8 is a conceptual diagram illustrating an example embodiment of a parse tree corresponding to the query shown in FIG. 7.

FIG. 7 is a conceptual diagram illustrating an example embodiment of a query 700. The query "if (between weekday ("PST"), 2, 3, ts ( . . . ))>100" can be determined to be a conditional query because it represents the conditional query, "return a data point if a data sample that is collected on Tuesday and Wednesday (based on Pacific Standard Time) is greater than 100." For example, a parser detecting a keyword ("if" in this example) can determine that the query is conditional. For example, the data points can represent temperatures. In this example, the answer to the query would be data points in input streams that correspond to every incidence of temperature exceeding 100 degrees on Tuesday or Wednesday. In other words, those temperatures recorded on Tuesday or Wednesday that are over 100 degrees are determined to satisfy the condition defined in the query.

FIG. 8 is a conceptual diagram illustrating an example embodiment of a parse tree 800 corresponding to the query shown in FIG. 7. The parsing can be performed according to various natural language processing techniques. The query "if (between weekday ("PST"), 2, 3, ts ( . . . ))>100" is parsed as follows. Each node in the parse tree is labeled with the corresponding semantic element of query 700. Element A is a predicate, element B is a candidate, element C is a lower threshold, element D is an upper threshold, and element E is a criteria. Each of these elements can be identified when the query is received and parsed.

The root of the tree 800 is "greater than." For example, when parsing in the query shown in FIG. 7, a first operation is a binary operation between the expression 100 and if( ). A first child, "100" is identified as a criteria and "if" is identified as a condition. The "if" then branches into three children, "between," "then," and "else." "Between" is identified as a predicate. "Then" and "else" are expected conditions for "if" where responsive to "if" being satisfied, outcomes associated with "then" occur. In this example, "then" corresponds to identifying and returning a data point. Otherwise, outcomes associated with "else" occur. In this example, "else" corresponds to not returning the point (because it does not meet the predicate).

"Between" branches into "weekday," "low," and "high." "Weekday" identifies the candidates that will be tested for satisfaction of the conditions (criteria and predicate) defined by the query. For example, data samples will be analyzed to determine weekday information contained in the data samples. "Low" and "high" are thresholds that are relevant to the predicate. In this example, "low" and "high" are thresholds defining a range for "between."

FIG. 9 is a conceptual diagram illustrating an example embodiment of generating an STS. In the example shown, the STS is generated from identified candidates and thresholds. Candidates 902 include weekdays, e.g. days of the week: Sunday through Saturday, the low threshold 904 is 2 corresponding to Tuesday, and the high threshold 906 is 3 corresponding to Wednesday. In a time series, the weekdays are represented by curve 908, the low threshold is represented by curve 912, and the high threshold is represented by curve 914.

The candidate, low threshold, and high threshold are inputs to annealing 920. The annealing 920 accepts these as inputs and outputs a STS as a result of the annealing. In FIG. 9, the STS 922 represents weekdays that fall on Tuesday or Wednesday, as shown by the high values corresponding to Tuesday and Wednesday and low values corresponding to the other days of the week. The STS can be used to identify candidates by focusing on the values of time series collected on Tuesdays and Wednesdays, as further described herein. In an embodiment, as shown, annealing includes joining the input time series 908, 912, and 914 to find their intersection.

FIG. 10 is a conceptual diagram illustrating an example embodiment of query implementation using an STS. In the example shown in FIG. 10, the query is performed on time series 1002.1-1002.5. According to the techniques described herein, an STS corresponding to the query is generated.

A reducer 1030 accepts times series as input and outputs one or more discrete data streams those most closely corresponds to the STS. The reducer receives input time series 1002.1-1002.5 and reducing the time series against the STS. Reducing the times series 1002.1-1002.5 and the STS is represented by overlay 1022. In the overlay, the STS is the thickened line 830.1. The input times series data set includes five times series, 1002.1-1002.5. The superimposed series show how closely (or far) that various time series correspond to the STS.

In the example shown in FIG. 10, candidate answers 1050.1, 1050.2, and 1050.3 are the three series selected from among 1002.1-1002.5, which most closely match the STS. The top three candidates are those that most closely match the STS. The top three candidates are 1050.1, 1050.2, and 1050.3, because their shapes most closely match the STS. How closely the shapes match an STS can be determined based on an amount by which one or more points in a time series deviate from the STS.

For example, time series 1002.4 and 1002.5 do not sufficiently match the STS because the time series data does not include Tuesday and Wednesday data. For example, stream 1002.4 includes Thursday and Friday data and stream 1002.5 includes Monday and Tuesday data. Thus, they do not closely match the STS. In some embodiments, the candidate answers are output as discrete data streams. These candidates are then processed with criteria 1024.

The candidate streams 1050.1-1050.3 are then analyzed to find those points that satisfy the condition "greater than 100" (labelled 1024). The output of the analysis is an answer to the query. The answer can be output for further processor and/or for rendering on a graphical user interface.

The techniques described herein find application in a variety of management systems including streaming (real-time) analytics platforms such as application delivery (reducing downtime), monitoring SaaS and software performance across cloud and on-premise services, operational analytics, big data management (including searching, navigating, analyzing, correlating, and visualizing millions of data points per second), Internet of Things (real-time overview of sensors and devices), business metrics, and the like. The techniques described herein can combine data, while maintaining high fidelity, where the data is discrete, continuous, or a combination thereof. The techniques described herein handle data streams are not aligned, maintain high fidelity when combining data streams, and identifies time series that conform to a pattern, even when the set of time series is very large.

Although the foregoing embodiments have been described in some detail for purposes of clarity of understanding, the disclosure is not limited to the details provided. There are many alternative ways of implementing the disclosure. The disclosed embodiments are illustrative and not restrictive.

What is claimed is:

1. A method of operating on data, comprising:
    receiving a query comprising an operation to be performed on input data streams;
    parsing the query to identify a predicate in the query and to determine candidates based on the query, wherein the predicate and the candidates form at least part of a basis for generating a synthetic time series;
    generating the synthetic time series for each candidate based on the query;
    receiving a first input data stream having a first type, wherein the first input data stream includes first input data stream samples associated with first input data stream sample times;
    receiving a second input data stream having a second type, wherein the second input data stream includes second input data stream samples associated with second input data stream sample times;
    determining whether at least some points in the second input data stream samples do not have synchronized samples in the first input data stream;
    automatically generating samples for the first input data stream that are synchronized with samples of the second input data stream;

determining whether at least some points in the first input data stream samples do not have synchronized samples in the second input data stream;
automatically generating samples for the second input data stream that are synchronized with samples of the first input data stream;
executing the query by performing the operation on the synthetic time series, the second input data stream samples of the second input data stream and the first input data stream samples, and the automatically generated samples of the first input data stream; and
delivering results of the operation indicating which of the input data streams most closely matches the synthetic time series as an answer to the query.

2. The method of claim 1, wherein the first input data stream is continuous.

3. The method of claim 1, wherein the first input data stream is discrete.

4. The method of claim 1, wherein the first type and the second type are different from one another.

5. The method of claim 1, wherein the first type and the second type are the same as one another.

6. The method of claim 1, wherein the first input data stream is specified by a function.

7. The method of claim 1, wherein the operation is adding the first input data stream and the second input data stream.

8. The method of claim 1, wherein the operation is joining the first input data stream and the second input data stream, the joining including annealing the first input data stream and the second input data stream.

9. The method of claim 1, wherein the operation is joining the first input data stream and the second input data stream without losing fidelity.

10. The method of claim 1, wherein the first input data stream and the second input data stream are not aligned with each other.

11. The method of claim 1, wherein the first input data stream includes first input data stream samples associated with first input data stream sample times, wherein the first input data stream samples are operated on directly without gridding the first input data stream.

12. The method of claim 1, further comprising delivering operation result directly to a browser as output points are generated and processed.

13. The method of claim 1, further comprising:
receiving a third input data stream; and
automatically generating samples for the third input data stream that are synchronized with samples of the first input data stream and the second input data stream;
wherein the performing the operation includes performing the operation on the automatically generated samples for the third input data stream.

14. A system for operating on data, comprising:
a processor configured to:
receive a query comprising an operation to be performed on input data streams;
parse the query to identify a predicate in the query and to determine candidates based on the query, wherein the predicate and the candidates form at least part of a basis for generating a synthetic time series;
generate the synthetic time series for each candidate based on the query;
receive a first input data stream having a first type, wherein the first input data stream includes first input data stream samples associated with first input data stream sample times;
receive a second input data stream having a second type, wherein the second input data stream includes second input data stream samples associated with second input data stream sample times;
determine whether at least some points in the second input data stream samples do not have synchronized samples in the first input data stream;
automatically generate samples for the first input data stream that are synchronized with samples of the second input data stream;
determine whether at least some points in the first input data stream samples do not have synchronized samples in the second input data stream;
automatically generate samples for the second input data stream that are synchronized with samples of the first input data stream;
execute the query by performing the operation on the synthetic time series, the second input data stream samples of the second input data stream and the first input data stream samples, and the automatically generated samples of the first input data stream; and
deliver results of the operation indicating which of the input data streams most closely matches the synthetic time series as an answer to the query; and
a memory coupled to the processor and configured to provide the processor with instructions.

15. The system of claim 14, wherein the first type is at least partially continuous and the second type is discrete.

16. The system of claim 14, wherein the operation is Joining the first input data stream and the second input data stream without losing fidelity.

17. A computer program product for operating on data, the computer program product being embodied in a non-transitory computer readable storage medium and comprising computer instructions for:
receiving a query comprising an operation to be performed on input data streams;
parsing the query to identify a predicate in the query and to determine candidates based on the query, wherein the predicate and the candidates form at least part of a basis for generating a synthetic time series;
generating the synthetic time series for each candidate based on the query;
receiving a first input data stream having a first type, wherein the first input data stream includes first input data stream samples associated with first input data stream sample times;
receiving a second input data stream having a second type; wherein the second input data stream includes second input data stream samples associated with second input data stream sample times;
determining that at least some points in the second input data stream samples do not have synchronized samples in the first input data stream and that at least some points in the first input data stream samples do not have synchronized samples in the second input data stream;
automatically generating samples for the first input data stream that are synchronized with samples of the second input data stream and automatically generating samples for the second input data stream that are synchronized with samples of the first input data stream;
executing the query by performing the operation on the synthetic time series, the second input data stream samples of the second input data stream and the first input data stream samples, and the automatically generated samples of the first input data stream; and delivering results of the operation indicating which of the input data streams most closely matches the synthetic time series as an answer to the query.

\* \* \* \* \*